United States Patent
Iraschko

(10) Patent No.: US 7,798,294 B2
(45) Date of Patent: Sep. 21, 2010

(54) BRAKE LINING FOR DISC BRAKES

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 853 days.

(21) Appl. No.: 10/556,056

(22) PCT Filed: May 6, 2004

(86) PCT No.: PCT/EP2004/004811

§ 371 (c)(1),
(2), (4) Date: Feb. 2, 2007

(87) PCT Pub. No.: WO2004/099642

PCT Pub. Date: Nov. 18, 2004

(65) Prior Publication Data

US 2007/0114102 A1    May 24, 2007

(30) Foreign Application Priority Data

May 8, 2003   (DE) ................. 103 20 605

(51) Int. Cl.
*F16D 65/40* (2006.01)
(52) U.S. Cl. ............... 188/73.38; 188/73.37; 188/73.36
(58) Field of Classification Search ............ 188/73.37, 188/73.31, 73.32, 73.35, 73.36, 73.38, 205 A
See application file for complete search history.

(56) References Cited

U.S. PATENT DOCUMENTS

| 3,638,765 | A | * | 2/1972 | Flaherty et al. | .......... | 188/73.38 |
|---|---|---|---|---|---|---|
| 3,712,423 | A | * | 1/1973 | Girauldon | ................ | 188/73.38 |
| 3,885,651 | A | * | 5/1975 | Odier | ....................... | 188/73.37 |
| 4,212,649 | A | * | 7/1980 | Sakurada et al. | ........... | 8/115.68 |
| 4,219,105 | A | * | 8/1980 | Delaunay | ................. | 188/73.38 |
| 4,306,636 | A | * | 12/1981 | Burgdorf et al. | ......... | 188/73.43 |
| 4,467,897 | A | * | 8/1984 | Kubo et al. | .............. | 188/73.38 |
| 4,940,119 | A | | 7/1990 | Kondo et al. | | |

FOREIGN PATENT DOCUMENTS

| DE | 38 39 957 A1 | 11/1988 |
|---|---|---|
| DE | 196 23 867 A1 | 1/1998 |
| EP | 0 534 987 B1 | 8/1994 |
| EP | 1 010 913 A2 | 6/2000 |
| EP | 0 703 378 B1 | 12/2001 |
| GB | 2 096 257 | 10/1982 |
| JP | 06280909 A * | 10/1994 |
| JP | 2002-327780 A | 11/2002 |

* cited by examiner

*Primary Examiner*—Robert A Siconolfi
*Assistant Examiner*—Mariano Sy
(74) *Attorney, Agent, or Firm*—Crowell & Moring LLP

(57) ABSTRACT

A lining for a disc brake, in particular, a pneumatically actuated disc brake designed for utility vehicles, includes a pressure plate and a lining material mounted on the pressure plate. At least one return mechanism located on the pressure plate causes axial return of the brake lining after brake applications, and presses against the lining housing of a disk brake and performs a tilting motion in the lining housing when the brake is applied. The return device also includes a tensioning device acting in a tangential direction and including a tensioning spring which, when the brake is not applied, elastically prestresses the pressure plate in the tangential direction relative to a disc of the disc brake that is towards the lining house such that the return device presses tangentially in prestressed manner against the lining housing.

12 Claims, 1 Drawing Sheet

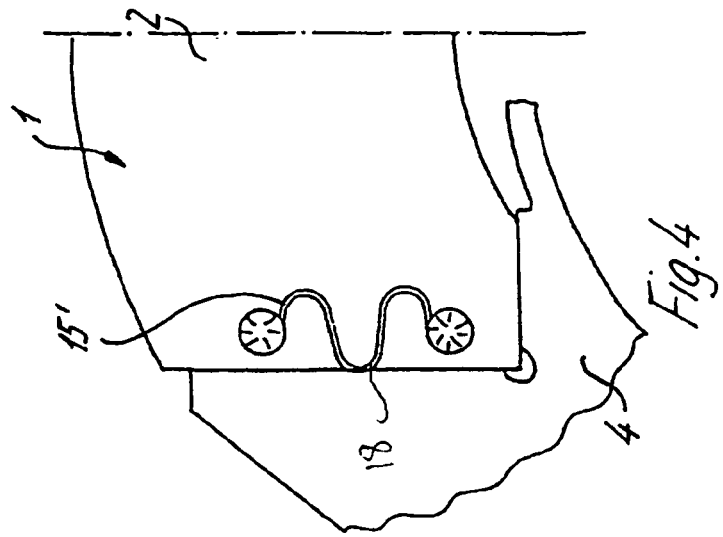
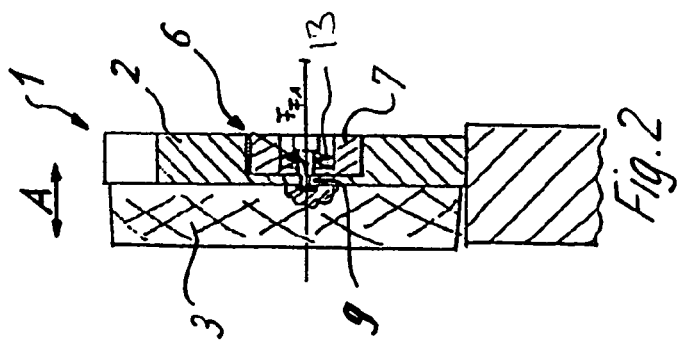
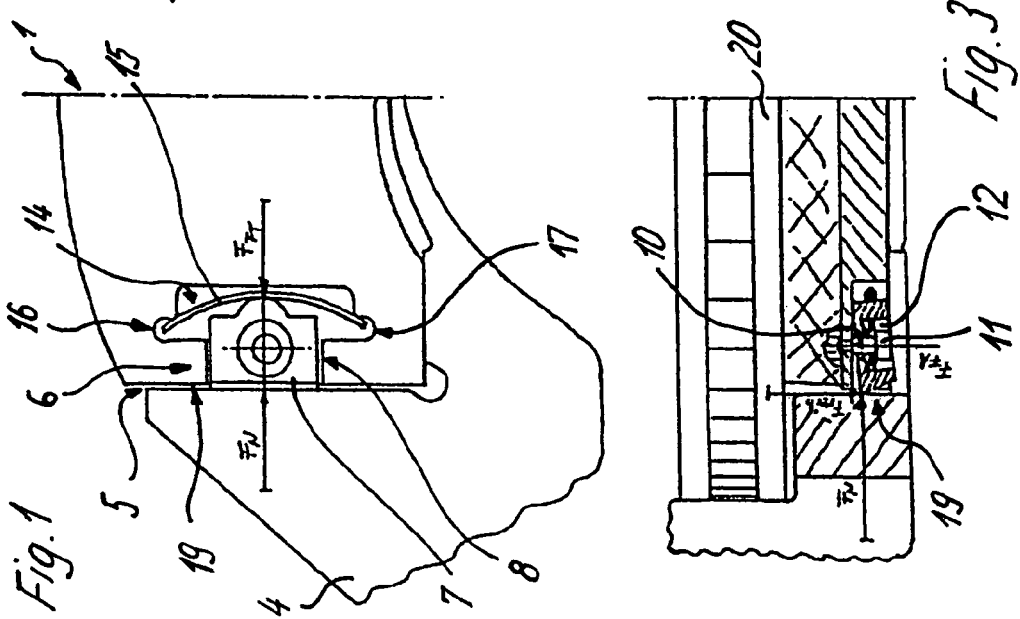

BRAKE LINING FOR DISC BRAKES

BACKGROUND AND SUMMARY OF THE INVENTION

The invention relates to a brake lining for a disc brake, particularly for a pneumatically actuated disc brake for commercial vehicles, having a pressure plate and a lining material mounted on the pressure plate, and at least one return device that axially returns the brake lining after braking operations, provided on the pressure plate. The return device rests on a lining groove of the disc brake and carries out a tilting movement in the lining groove when braking operation occurs.

A lining of the generic type is disclosed in EP 0 534 987 B1. This lining has a pressure plate and a lining material mounted on the pressure plate, a flat spring being arranged at one of the outer edges of the pressure plate, which flat spring rests at the caliper side on a removable retaining element and, when assembled, is prevented from being detached by way of two holding clips.

This lining is particularly suitable for application in pneumatically actuated disc brakes, as are known, for example, from the product information document "Pneumatisch betätigte Scheibenbremse—Die Standardbremse für moderne Nutzfahrzeuge" ["Pneumatically actuated disc brakes—The standard brakes for modern commercial vehicles"] from Knorr-Bremse Systeme für Nutzfahrzeuge. A similar design is presented in the more recent EP 0 703 378 B1.

In the case of disc brakes, as are known, for example, from EP 703 378 B1, the sliding caliper and the brake carrier—on which the sliding caliper is displaceably guided—together form lining grooves, into which the brake linings are inserted from above.

When braking operations occur, the brake lining on the side of the brake caliper which is provided with a brake application device is first pressed against the brake disc. The subsequent sliding movement of the caliper then causes the brake lining arranged on the opposite side of the brake caliper to likewise be pressed against the brake disc. The brake linings in the lining grooves of the brake carrier are in the process pushed in the direction of the brake disc.

After the braking operation, the brake application unit, the caliper and the linings must be returned. A return spring of the brake application device, which brings about a spring force between the caliper and a cross brace of the application device, and therefore a relative displacement between these two components after the braking operation, serves to return the application unit.

On the other hand, in contrast to, for example, brake linings for drum brakes that retract from the brake drum, the brake linings for disc brakes are not generally retracted from the brake disc actively, since it is assumed that the brake linings are released from the brake disc again independently through vibration and the like.

However, in such a case there may be the problem that, under some circumstances, the brake caliper also has some preload from the flat springs acting as holding elements, which directly influences the return behavior of the brake caliper.

A large holding force brings about a correspondingly high preload on the brake caliper and can thus, under some circumstances, adversely affect the return process. A similar effect can occur with the brake linings. Incomplete retraction can lead to the brake linings grinding on the disc. Although this does not adversely affect safety, the grinding does however lead to faster brake lining wear and, therefore, increases the operating costs.

For the purpose of noise damping, it is known from DE 196 23 867 C2 to arrange rubber elements between a supporting element and the pressure plate on the tangential supporting surfaces of the pressure plate for the purpose of providing support in the lining groove of the brake carrier.

A supporting element for brake linings of disc brakes, which element is preloaded by the use of a spring, is also known from DE 196 23 867 C2 (see column 4, row 30 et seq. in this document). The supporting element also has the effect of a return element. This firstly leads to a tilting movement at the lining carrier groove when braking operations occur. The spring has a returning effect in the axial direction when the braking operation has ended. According to the knowledge of the present invention, however, the return movement is relatively undefined, on account of the relatively undefined force with which support is provided in the tangential direction.

Taking the generic prior art as a starting point, it is therefore an object of the invention to improve the return of the brake linings using simple structural mechanisms. If the brake caliper is in the form of a moveable caliper, that is to say of a sliding, floating or pivoting caliper, the return movement of the brake caliper should preferably also be assisted. The invention should, however, also be suitable in principle for disc brakes with fixed calipers.

The invention achieves this object by providing a return device having a tensioning device which acts in the tangential direction with a tensioning spring which, when the brake is not applied, elastically preloads the pressure plate in the tangential direction relative to a brake disc of the disc brake, that is to say in the direction of the lining groove, so that the return device rests tangentially on the lining groove in a preloaded state.

The tensioning device with the tensioning spring makes it possible for the tangential support of the return elements on the brake lining groove to be preset in a defined fashion, hence making it possible to obtain an accurately controlled return movement of brake lining and—if moveable—the brake caliper.

According to one embodiment, the return device has a return element which is moveably guided in a recess of the pressure plate, the tensioning spring preloading the return element tangentially in the direction of the lining groove. The return element rests on the lining groove.

A particularly good function of the return movement is achieved with this structural refinement.

The tensioning springs expediently rest between the return element and the pressure plate. According to a preferred, particularly reliable and therefore low-cost design, the tensioning spring is in turn formed particularly as a curved flat or wire spring, which engages with its ends in lateral lugs on each side of the recess for the return element, rests there and acts, with a central bulged region, on the return element.

In a particularly low-cost embodiment, the tensioning spring, the functions of the axial return spring and of the return and tensioning element, can alternatively be combined in a single element. This allows, by way of example, the tensioning spring to be formed in an uncomplicated manner as a singly or multiply curved inward flat or wire spring, which is fixed with both of its ends to the pressure plate and has a bulge which rests on the lining groove.

If wear occurs on the lining, the return elements and the lining in the lining groove are displaced.

For this purpose it is expedient if, according to a further preferred embodiment, the spring force of the tensioning spring is less than the frictional force between the lining guiding or supporting surfaces in the lining groove and the return elements.

The invention is particularly suitable for moveable brake calipers such as sliding or floating calipers. It is, however, also suitable in principle for fixed calipers, in which case it improves solely the return of the brake linings.

It is possible, depending on the design and type of brake, to provide the return devices at the brake linings on only one or on both sides of the brake disc.

Advantageous refinements are described and/or claimed herein.

BRIEF DESCRIPTION OF THE DRAWINGS

The invention is described in more detail in the following on the basis of exemplary embodiments and with reference to the drawings, in which:

FIG. 1 is a side view of a lining groove on a brake carrier and a first brake lining according to the invention inserted therein;

FIGS. 2 and 3 are two sectional views; differing by 90°, of regions of the exemplary embodiment in FIG. 1, with FIG. 2 showing the return element in the deflected position; and FIG. 4 is a side view of a lining groove on a brake carrier and a second brake lining according to the invention.

DETAILED DESCRIPTION OF THE DRAWING

FIG. 1 shows a brake lining 1 or a brake pad, which consists of a lining carrier plate or pressure (distribution) plate 2 and a lining material 3 mounted on the pressure plate 2.

The brake lining 1 is designed for application in disc brakes, and is particularly suitable for pneumatically actuated disc brakes with a sliding or floating caliper (not illustrated in detail here).

In the case of disc brakes, the brake caliper and/or, if present, the brake carrier 4, on which a sliding caliper is displaceably guided, form lining grooves 5, into which the brake linings 1 are inserted "from above".

When braking operations occur, the brake lining 1 on the side of the brake caliper which is provided with a brake application device is firstly pressed against the brake disc. The subsequent sliding movement of the brake caliper, in the case of a sliding caliper, then causes the brake lining arranged on the opposite (reaction) side of the brake caliper to likewise be pressed against the brake disc (not illustrated here).

In order to improve the return of the brake lining and of the brake caliper following the braking operation, the brake lining is provided with at least one return device 6. Preferably, two return devices 6 are arranged on the brake lining, on the side walls or supporting surfaces 19 of the pressure plate 2, which are oriented towards the two side walls of the lining groove 5 (in the circumferential rotational direction of the brake disc and towards it).

The return device 6 according to FIGS. 1 to 3 has a return element 7, which is moveably guided in a recess 8 in the rear side edge region of the pressure plate 2. The return element 7 itself has a hole 9 which is penetrated by a bolt 10, which is fixed in the pressure plate 2. The return element 7 is displaceably guided in the axial direction on the bolt. The hole 9 has a larger diameter than the bolt 10, so that the return element 7 can also be moved or tilted perpendicularly to the axial displacement direction A of the brake lining.

A bolt head 11 of the bolt 10 is arranged here in a depression 12 in the return element 7 on its side which faces away from the pressure plate 2, so that the build depth of the lining carrier plate or pressure plate 2 is not increased in the axial direction (relative to a brake disc or relative to the arrow A in FIG. 2).

An axially acting return spring 13, particularly a coil spring or plate spring, is also attached to the bolt 10 between the bolt head 11 and the return element 7 (formed, for example, as a small metal plate), which spring preloads the return element in the direction of the pressure plate 2.

The return devices 6 also include tensioning devices 14, which act elastically in the tangential direction relative to the brake disc 20, and which are implemented according to FIG. 1, for example, by way of tensioning springs 15 which rest between the return element 7 and the pressure plate 2 and elastically preload the return element 7 tangentially on the brake carrier 4 (relative to the brake disc or in the circumferential direction of the brake disc) in the direction of the inner wall of the lining groove 5.

According to FIG. 1, the tensioning spring 15 acts on the return element 7, which is displaceably guided in the recess of the pressure plate 2, in the circumferential direction of the brake disc. The tensioning spring 15 is, for example, a curved flat or wire spring which engages with its ends in lateral lugs 16, 17 on each side of the recess 8 for the return element 7 and acts, with the central bulged region, on the return element 7.

When the brake lining 1 is pushed forward in the direction of the brake disc 20 when braking is occurring (FIG. 3), the return elements 7, which are supported on the corresponding lining groove wall of the brake carrier 4 by way of the tensioning spring 15, yield to the axially acting spring force of the return spring 13 by way of a tilting movement, that is to say the preloaded return elements 7 are tilted at the brake carrier. After the end of the braking operation, the axially acting return spring 13 therefore ensures that the brake lining 1 is retracted by the opposing tilting movement of the return element 7, which assists both the return of the brake lining 1 and, in the case of sliding, floating or pivoting calipers, the return of the brake caliper which rests against the pressure plate 2 on the reaction side.

If wear occurs on the brake lining 1, the brake lining 1 and the tensioning element 7 are pushed a distance in the direction of actuation equal to the degree of wear. In order to ensure this functional procedure it is therefore necessary for the spring force of the tensioning spring 15 to be less than the frictional force between the lining guiding or supporting surfaces 19 and the return and tensioning elements 7.

In contrast, according to FIG. 4, no return element 7 is provided, but rather the tensioning spring 15' acts as a multiply bent inward flat or wire spring directly between the pressure plate 2 and the lining groove 5 to give a tangential tensioning effect. When a braking operation occurs, the bulge or bend 18 rests on the inner wall of the brake carrier 4, so that the tensioning spring 15' which is attached with its free ends, in a rotationally fixed manner, to the pressure plate 2 is additionally bent inwards or turned inwards, which gives rise to an additional axial return force. The function therefore corresponds in principle to the function of FIG. 1, with the difference here that the tensioning spring 15' also combines the functions of the return spring 13 and the return and tensioning element 7.

| Table of Reference Symbols | |
|---|---|
| Brake lining | 1 |
| Pressure plate | 2 |
| Lining material | 3 |
| Brake carrier | 4 |
| Lining groove | 5 |
| Return device | 6 |
| Return element | 7 |

-continued

Table of Reference Symbols

| | |
|---|---|
| Recess | 8 |
| Hole | 9 |
| Bolt | 10 |
| Bolt head | 11 |
| Depression | 12 |
| Return spring | 13 |
| Tensioning devices | 14 |
| Tensioning spring | 15, 15' |
| Lugs | 16, 17 |
| Bulge | 18 |
| Supporting surfaces | 19 |

The invention claimed is:

1. A brake lining for a disc brake for commercial vehicles, comprising:
   a pressure plate and a lining material mounted on the pressure plate; and
   at least one return device, which axially returns the brake lining after braking operations, provided on the pressure plate, which return device rests in a lining groove of the disc brake and carries out a tilting movement in the lining groove when braking operation occurs;
   wherein the return device includes a return element movable within a recess in the pressure plate and a tensioning device which acts in a tangential direction via a tensioning spring which, when the brake is not applied, preloads the pressure plate elastically in the tangential direction relative to a brake disc toward the lining groove so that the return device rests tangentially on the lining groove in a preloaded state; and
   wherein the tensioning spring rests between the return element and the pressure plate.

2. The brake lining as claimed in claim 1, wherein the return device has a return element which is moveably guided in a recess of the pressure plate, the tensioning spring preloading the return element tangentially in the direction of the lining groove, said return element resting on the lining groove.

3. The brake lining as claimed in claim 2, wherein the return element has a hole which is penetrated by a bolt, the bolt being fixed in the pressure plate, and the return element being displaceably guided in the axial direction on the bolt.

4. The brake lining as claimed in claim 3, wherein the hole has a larger diameter than the bolt so that the return element is tiltable relative to the bolt, and further wherein an axially acting return spring preloads the return element in the direction of the pressure plate.

5. The brake lining as claimed in claim 2, wherein a spring force of the tensioning spring is less than the frictional force between a lining guiding or supporting surfaces in the lining groove and the return element.

6. The brake lining as claimed in claim 3, wherein a spring force of the tensioning spring is less than the frictional force between a lining guiding or supporting surfaces in the lining groove and the return element.

7. A brake lining for a disc brake for commercial vehicles, comprising:
   a pressure plate and a lining material mounted on the pressure plate; and
   at least one return device, which axially returns the brake lining after braking operations, provided on the pressure plate, which return device rests in a lining groove of the disc brake and carries out a tilting movement in the lining groove when braking operation occurs;
   wherein the return device includes a tensioning device which acts in a tangential direction via a tensioning spring which, when the brake is not applied, preloads the pressure plate elastically in the tangential direction relative to a brake disc toward the lining groove so that the return device rests tangentially on the lining groove in a preloaded state;
   wherein the return device has a return element which is moveably guided in a recess of the pressure plate, the tensioning spring preloading the return element tangentially in the direction of the lining groove, said return element resting on the lining groove; and
   wherein the tensioning spring rests between the return element and the pressure plate.

8. The brake lining as claimed in claim 7, wherein the tensioning spring is formed as a curved flat or wire spring, which engages with its ends in lateral lugs on each side of the recess for the return element and acts, with the central bulged region, on the return element.

9. The brake lining as claimed in claim 7, wherein a spring force of the tensioning spring is less than the frictional force between a lining guiding or supporting surfaces in the lining groove and the return element.

10. Brake lining for a disc brake for commercial vehicles, comprising:
    a pressure plate and a lining material mounted on the pressure plate; and
    at least one return device, which axially returns the brake lining after braking operations, provided on the pressure plate, which return device rests in a lining groove of the disc brake and carries out a tilting movement in the lining groove when braking operation occurs;
    wherein the return device includes a tensioning device which acts in a tangential direction via a tensioning spring which, when the brake is not applied, preloads the pressure plate elastically in the tangential direction relative to a brake disc toward the lining groove so that the return device rests tangentially on the lining groove in a preloaded state;
    wherein the return device has a return element which is moveably guided in a recess of the pressure plate, the tensioning spring preloading the return element tangentially in the direction of the lining groove, said return element resting on the lining groove; and
    wherein the tensioning spring is formed as a curved flat or wire spring, which engages with its ends in lateral lugs on each side of the recess for the return element and acts, with a central bulged region, on the return element.

11. A brake lining for a disc brake for commercial vehicles, comprising:
    a pressure plate and a lining material mounted on the pressure plate; and
    at least one return device, which axially returns the brake lining after braking operations, provided on the pressure plate, which return device rests in a lining groove of the disc brake and carries out a tilting movement in the lining groove when braking operation occurs;
    wherein the return device includes a tensioning device which acts in a tangential direction via a tensioning spring which, when the brake is not applied, preloads the pressure plate elastically in the tangential direction relative to a brake disc toward the lining groove so that the return device rests tangentially on the lining groove in a preloaded state;
    wherein the return device has a return element which is moveably guided in a recess of the pressure plate, the tensioning spring preloading the return element tangentially in the direction of the lining groove, said return element resting on the lining groove;

wherein the return element has a hole which is penetrated by a bolt, the bolt being fixed in the pressure plate, and the return element being displaceably guided in the axial direction on the bolt; and wherein the tensioning spring rests between the return element and the pressure plate.

12. The brake lining as claimed in claim 11, wherein the tensioning spring is formed as a curved flat or wire spring, which engages with its ends in lateral lugs on each side of the recess for the return element and acts, with the central bulged region, on the return element.

* * * * *